United States Patent
Gilleran (10) Patent No.: US 12,173,498 B2
(45) Date of Patent: Dec. 24, 2024

(54) FLASHING SYSTEM FOR USE WITH ELECTRICAL SERVICE PANELS

(71) Applicant: WJG, LLC, Las Vegas, NV (US)

(72) Inventor: William J. Gilleran, Las Vegas, NV (US)

(73) Assignee: WJG, LLC, Las Vegas, NV (US)

( * ) Notice: Subject to any disclaimer, the term of this patent is extended or adjusted under 35 U.S.C. 154(b) by 134 days.

(21) Appl. No.: 17/727,481

(22) Filed: Apr. 22, 2022

(65) Prior Publication Data
US 2022/0341157 A1    Oct. 27, 2022

Related U.S. Application Data

(60) Provisional application No. 63/178,974, filed on Apr. 23, 2021.

(51) Int. Cl.
| | | |
|---|---|---|
| *H02G 3/08* | (2006.01) | |
| *E04B 1/70* | (2006.01) | |
| *E06B 1/70* | (2006.01) | |
| *H02B 1/40* | (2006.01) | |
| *E06B 1/62* | (2006.01) | |

(52) U.S. Cl.
CPC .............. *E04B 1/70* (2013.01); *H02B 1/40* (2013.01); *E06B 2001/628* (2013.01); *H02G 3/088* (2013.01)

(58) Field of Classification Search
CPC ....... E06B 2001/628; E04B 1/70; H02B 1/28; H02B 1/40; H02G 3/088; H02G 3/081
See application file for complete search history.

(56) References Cited

U.S. PATENT DOCUMENTS

| | | | | |
|---|---|---|---|---|
| 4,794,207 A | * | 12/1988 | Norberg ................ | H02G 3/125 174/505 |
| 5,018,333 A | * | 5/1991 | Bruhm ............... | E04D 13/1475 52/60 |
| 5,287,665 A | * | 2/1994 | Rath, Jr. ............... | H02G 3/126 52/27 |
| 5,369,548 A | * | 11/1994 | Combs .................... | H02B 1/40 174/148 |
| 7,132,601 B1 | * | 11/2006 | Seff ....................... | H02G 3/088 174/53 |
| 10,041,688 B1 | * | 8/2018 | Droppo .................... | F24D 19/08 |
| 10,297,997 B1 | * | 5/2019 | Wiese ...................... | H02G 3/14 |
| 10,505,354 B2 | * | 12/2019 | Wade ...................... | H02G 3/081 |
| 11,258,243 B1 | * | 2/2022 | Gretz ..................... | H02G 3/126 |
| 2002/0125031 A1 | * | 9/2002 | Gilleran ................ | H02G 3/123 174/58 |

(Continued)

*Primary Examiner* — Kyle J. Walraed-Sullivan
(74) *Attorney, Agent, or Firm* — Howard & Howard Attorneys PLLC (57) ABSTRACT

A flashing system for use with an electrical service panel is described. The flashing system includes a flashing assembly extending about a perimeter of the electrical services panel. The flashing assembly includes a support base including a planar outer surface and a flanged connection assembly extending obliquely from the planar outer surface of the support base and defining an opening configured to receive the electrical service panel therethrough. The flanged connection assembly includes an inner surface that is coupled to an outer surface of the electrical service panel for supporting the flashing assembly from the electrical service panel.

14 Claims, 11 Drawing Sheets

(56) References Cited

U.S. PATENT DOCUMENTS

| | | | | |
|---|---|---|---|---|
| 2004/0182857 | A1* | 9/2004 | Feyes | H02G 3/088 |
| | | | | 220/3.2 |
| 2005/0102913 | A1* | 5/2005 | Gilleran | F24F 1/34 |
| | | | | 52/58 |
| 2012/0262037 | A1* | 10/2012 | Qin | H02G 3/14 |
| | | | | 312/223.1 |
| 2014/0023804 | A1* | 1/2014 | Coscarella | H02G 3/14 |
| | | | | 428/34.1 |
| 2017/0138113 | A1* | 5/2017 | Norwood | E06B 1/36 |
| 2018/0209205 | A1* | 7/2018 | Gilleran | H02G 3/10 |
| 2020/0014182 | A1* | 1/2020 | Yang | H02G 3/088 |
| 2020/0052469 | A1* | 2/2020 | Janish | H02B 1/28 |
| 2020/0119533 | A1* | 4/2020 | Wade | H02G 3/081 |
| 2020/0321739 | A1* | 10/2020 | Broere | H01R 24/78 |
| 2022/0085585 | A1* | 3/2022 | Wade | H02G 3/088 |
| 2022/0239082 | A1* | 7/2022 | Uebelhoer | H02G 3/10 |
| 2023/0183982 | A1* | 6/2023 | Maurer | F24F 13/084 |
| | | | | 52/220.1 |

* cited by examiner

FLASHING SYSTEM FOR USE WITH ELECTRICAL SERVICE PANELS

CROSS-REFERENCE TO RELATED APPLICATION

This application claims the benefit of U.S. Provisional Patent Application Ser. No. 63/178,974, filed on Apr. 23, 2021, all of which is hereby incorporated by reference in its entirety for all purposes.

TECHNICAL FIELD

This invention relates generally to flashing systems, and more specifically, to a flashing system for use with an electrical service panel.

BACKGROUND OF THE INVENTION

The present invention relates generally to external mounting frames positioned around an exterior oriented electrical service panel, and more particularly to a moisture-resistant flashing panel mount which is adapted for a residential and/or commercial electrical service panel so as to prohibit passage of water around the electrical service panel and into the wall of a residential and/or commercial building.

In view of potentially untoward consequences that can develop upon the entry of water into the interior of a residential and/or commercial building structure, it is extremely important that vulnerable areas such as those surrounding exterior electrical service panels disposed within external building walls be weatherproofed to prohibit undesirable moisture entry into the building structure. As is recognized, such water entry, whether from rain, snow, mis-directed lawn sprinklers, or vandalism, can literally ruin floors, walls, ceilings, etc., within a building as the water travels within the hidden inner portions of the structure.

In order to alleviate such problem, lath paper has been applied in layers over the entire vertical surface exterior walls of a residential and/or commercial building with the lath affixed to the wall frame members, such as wood studs for example. The lath paper is either cut out or torn out around the exterior electrical service panel. Caulking is then typically applied at interface sites of the electrical service panel and lath paper in an effort to weather-proof the exterior electrical service panel. Then, conventional exterior wall finish materials such as stucco, wood, brick, etc., are used to cover or finish the outside of the residential and/or commercial building structure.

If the installer of the lath paper does not properly apply the caulk to the electrical service panel/lath interface to form a weather-proof seal, the installation is immediately flawed, and water entry can occur shortly after completion. For example, during installation of known electrical service panels, dust and debris may collect on the panels creating a surface that is unsuitable for adhering caulk and/or lath paper. In addition, through the passage of time and the accompanying environmental influences, the caulk compound oftentimes cracks and eventually breaks away. Thereafter, environmental moisture can easily enter the building from the cracks and voids formed around the electrical service panel and eventually causes severe water damage as described above within the building structure.

In view of the costly damage that can occur because of water intrusion, it is apparent that a need is present for effective and long-lasting moisture protection that can be quickly and properly installed during the building process and remain viable for the life of the structure.

The present invention addresses one or more of the aforementioned challenges.

SUMMARY OF THE INVENTION

In one aspect of the present invention, a flashing system for use with an electrical service panel is provided. The flashing system includes a flashing assembly extending about a perimeter of the electrical services panel. The flashing assembly includes a support base including a planar outer surface and a flanged connection assembly extending obliquely from the planar outer surface of the support base and defining an opening configured to receive the electrical service panel therethrough. The flanged connection assembly includes an inner surface that is coupled to an outer surface of the electrical service panel for supporting the flashing assembly from the electrical service panel.

In another aspect of the present invention a method of installing a flashing assembly onto an electrical service panel is provided. The flashing assembly includes a plurality of flashing members including an upper flashing member, a bottom flashing member, and a pair of side flashing members. Each flashing member includes a support member having a planar outer surface and a connection flange member extending obliquely from the planar outer surface. The method includes coupling the bottom flashing member to a bottom portion of the electrical service panel, coupling the pair of side flashing members to opposing sides of the electrical service panel such that each of the pair of side flashing members overlap portions of the bottom flashing member, and coupling the upper flashing member to a top portion of the electrical service panel such that the upper flashing member overlaps portions of each side flashing member.

BRIEF DESCRIPTION OF THE DRAWINGS

Other advantages of the present invention will be readily appreciated as the same becomes better understood by reference to the following detailed description when considered in connection with the accompanying drawings wherein.

Corresponding reference characters indicate corresponding parts throughout the drawings.

DETAILED DESCRIPTION

In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

With reference to the drawings and in operation, the present invention is directed towards a moisture-proof flashing system 10 that is specifically adapted for use with an electrical service panel 12 disposed within a building structure wall. It will be contemplated by a person of ordinary skill in the art that the flashing system 10 may be formed to have a variety of shapes, configurations, geometries and sizes other than for that shown in the provided figures. Furthermore, it should be noted that the electrical service panel 12 is an exemplary one typically used within any building structure wall.

The electrical service panel flashing system 10 adheres around the electrical service panel with caulk, double faced tape or any suitable construction adhesive. The flashing system 10 provides a flange for a builder to incorporate a flashing around the main electrical service panel providing protection from moisture, air, insects, or water from migrating into the structure when weatherizing or wrapping. During installation, an installer first removes any construction dust, debris, or foreign materials from the outer surface of the electrical service panel using an alcohol wipe, cloth, or similar cleaning wipe, applied to the exterior surfaces of the electrical service panel. The installer then applies the bottom piece of the flashing system 10 to the bottom of the main electrical service panel using double-sided adhesive tape. Similarly, the installer then applies the two side pieces to the left and right side of the main electrical service panel overlapping the bottom piece using double-sided adhesive tape, then applies the top piece of the flashing system 10 at the top of the main electrical service panel overlapping the two side pieces using double-sided adhesive tape. In some embodiments, the installer may apply double-sided adhesive tape to the bottom, sides, and top exterior surfaces of the electrical service panel prior to applying the flashing system 10. In other embodiments, double-sided adhesive tape may be applied to each piece of the flashing system 10 before adhering the flashing system 10 to the electrical service panel.

The flashing system 10 may be formed of flexible or rigid materials. In some embodiments, the flashing system 10 may be formed from thermoplastic elastomer having a Hardness, ASTM D 2240, Shore A, 10 Seconds: 93; Specific Gravity, ASTM D 792: 1.05 g/cm3; and Tensile Strength, ASTM D 412: 1,300 psi.

Figure 1:
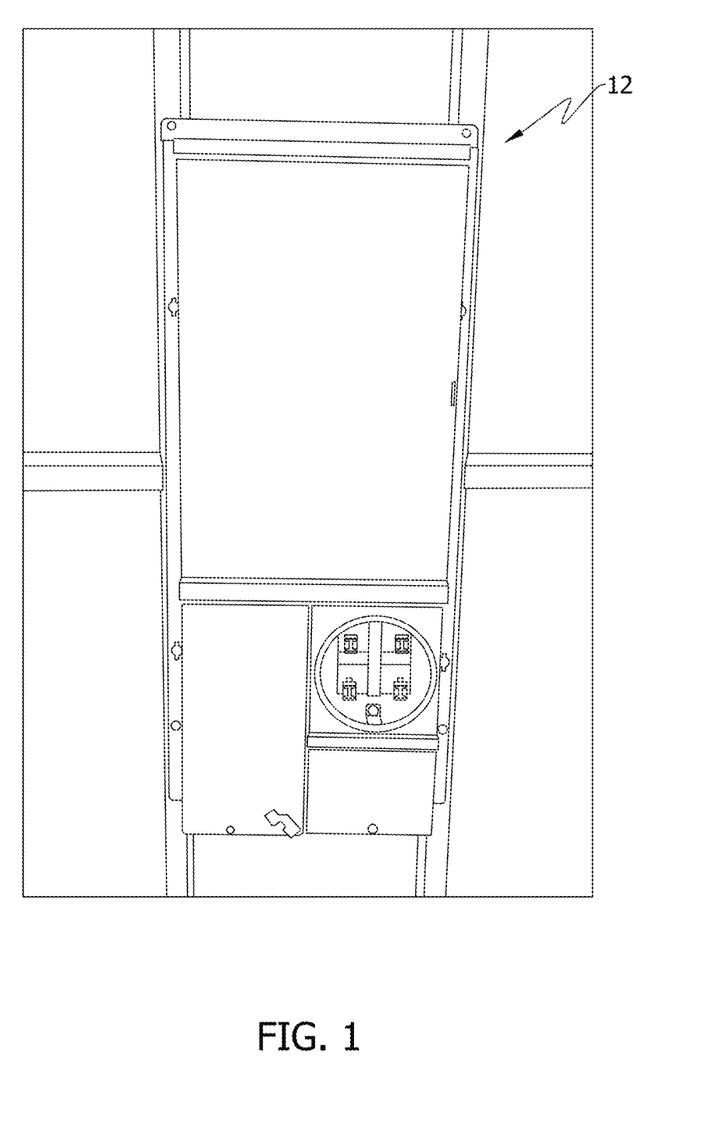
FIG. 1 is a perspective view of an electrical service panel.
Figure 2:
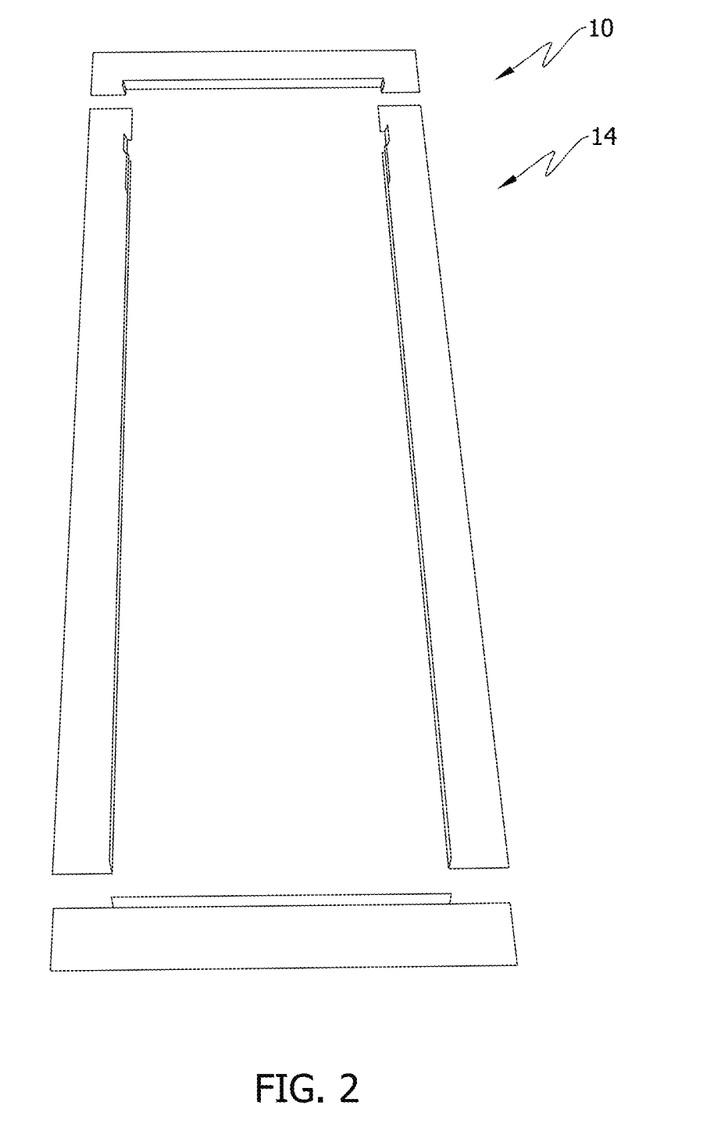
FIG. 2 is a perspective view of a flashing system for use with the electrical service panel shown in FIG. 1.
Figure 3:
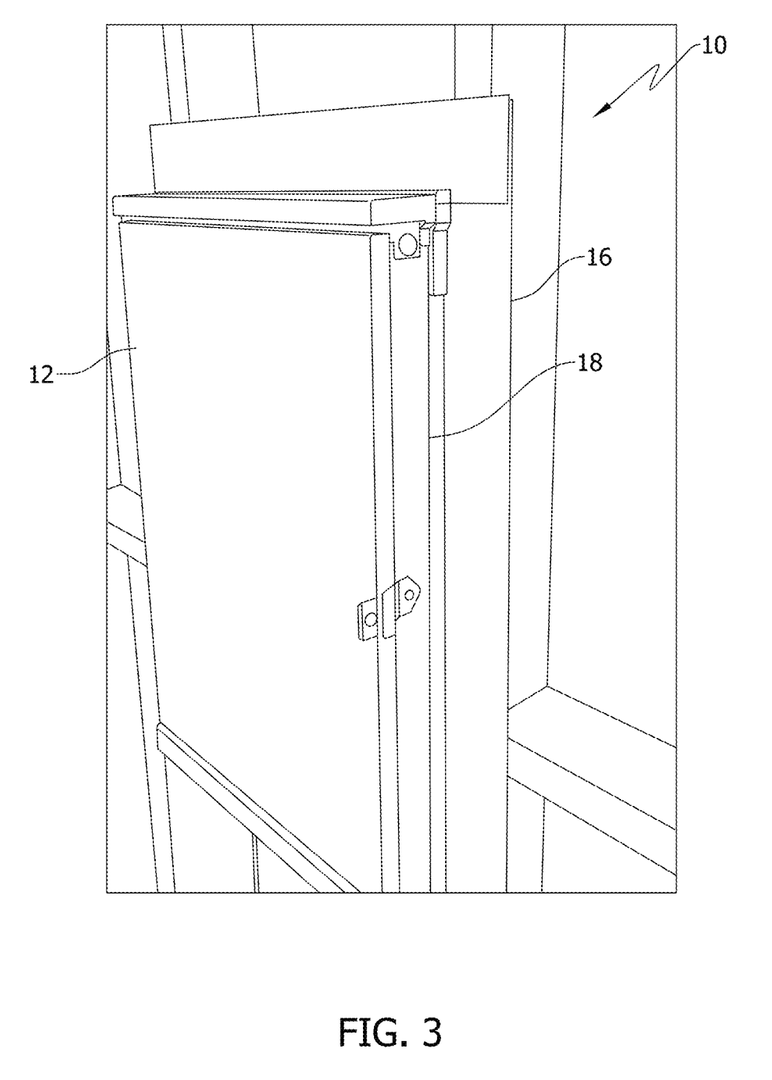
FIGS. 3-5 are perspective views of a portion of the flashing system mounted to the electrical service panel.
Figure 4:
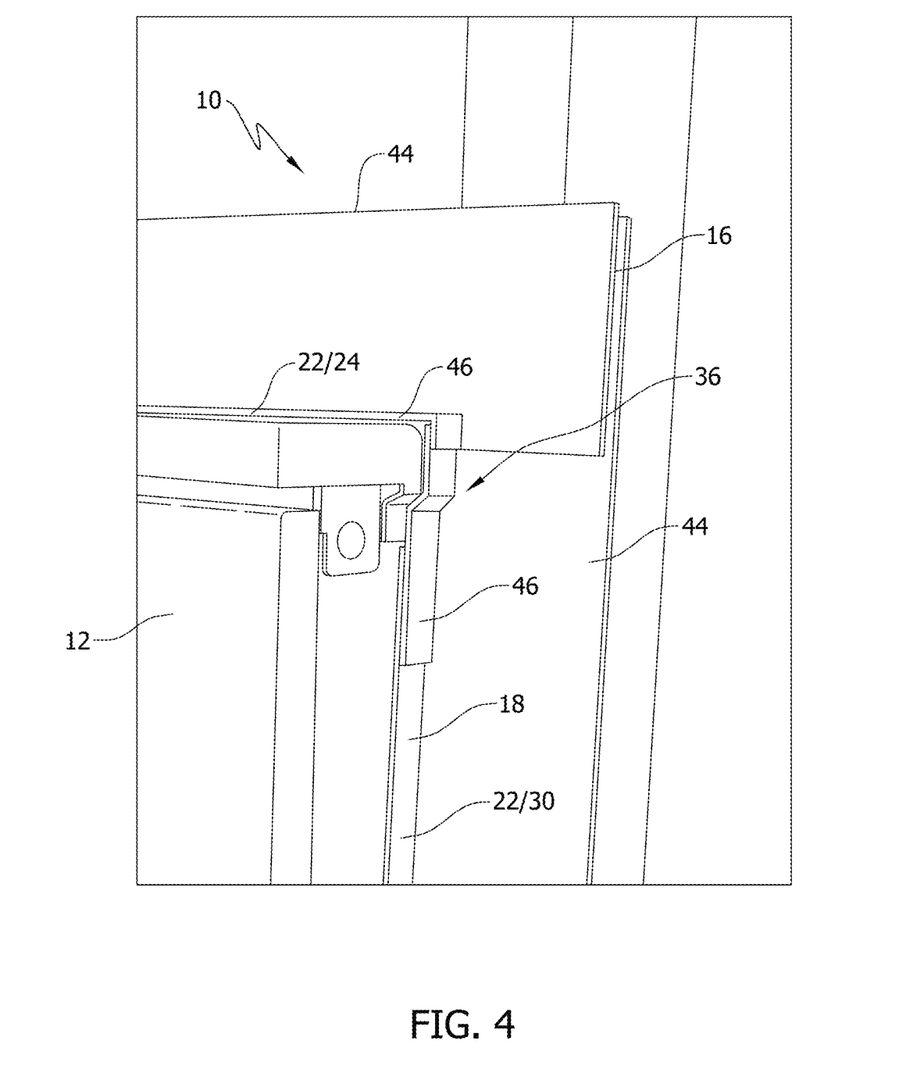
Figure 5:
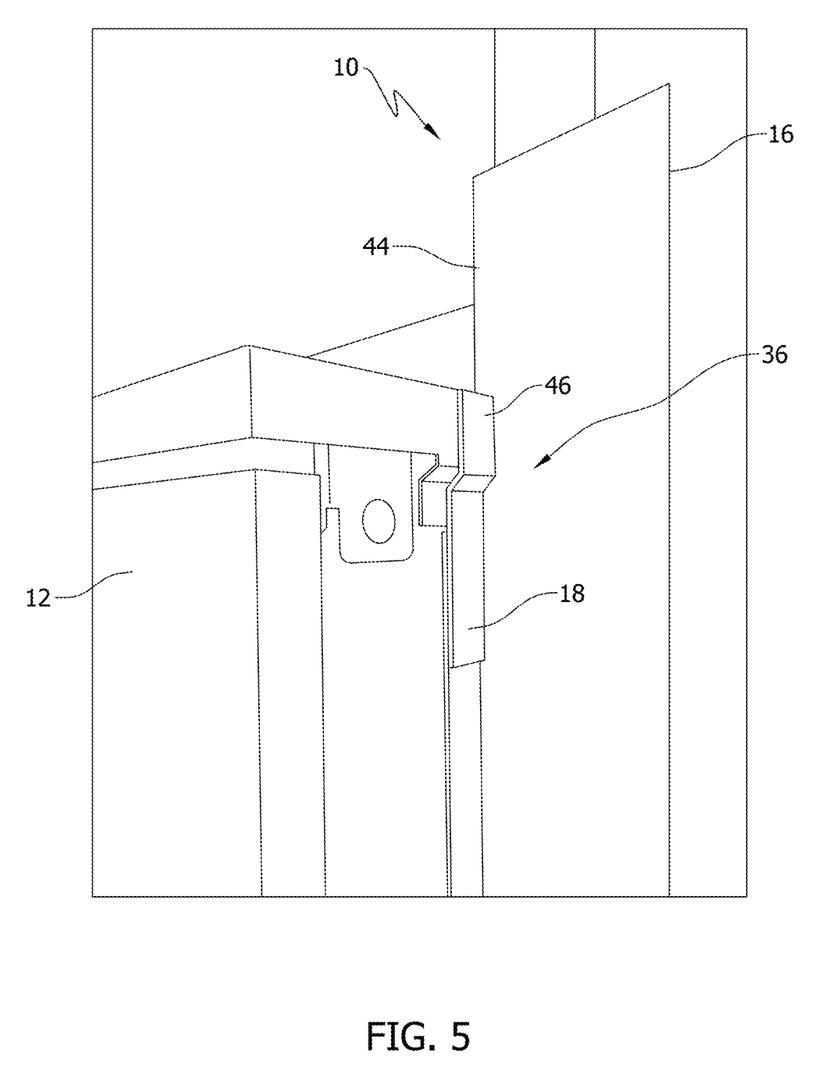
Figure 6:
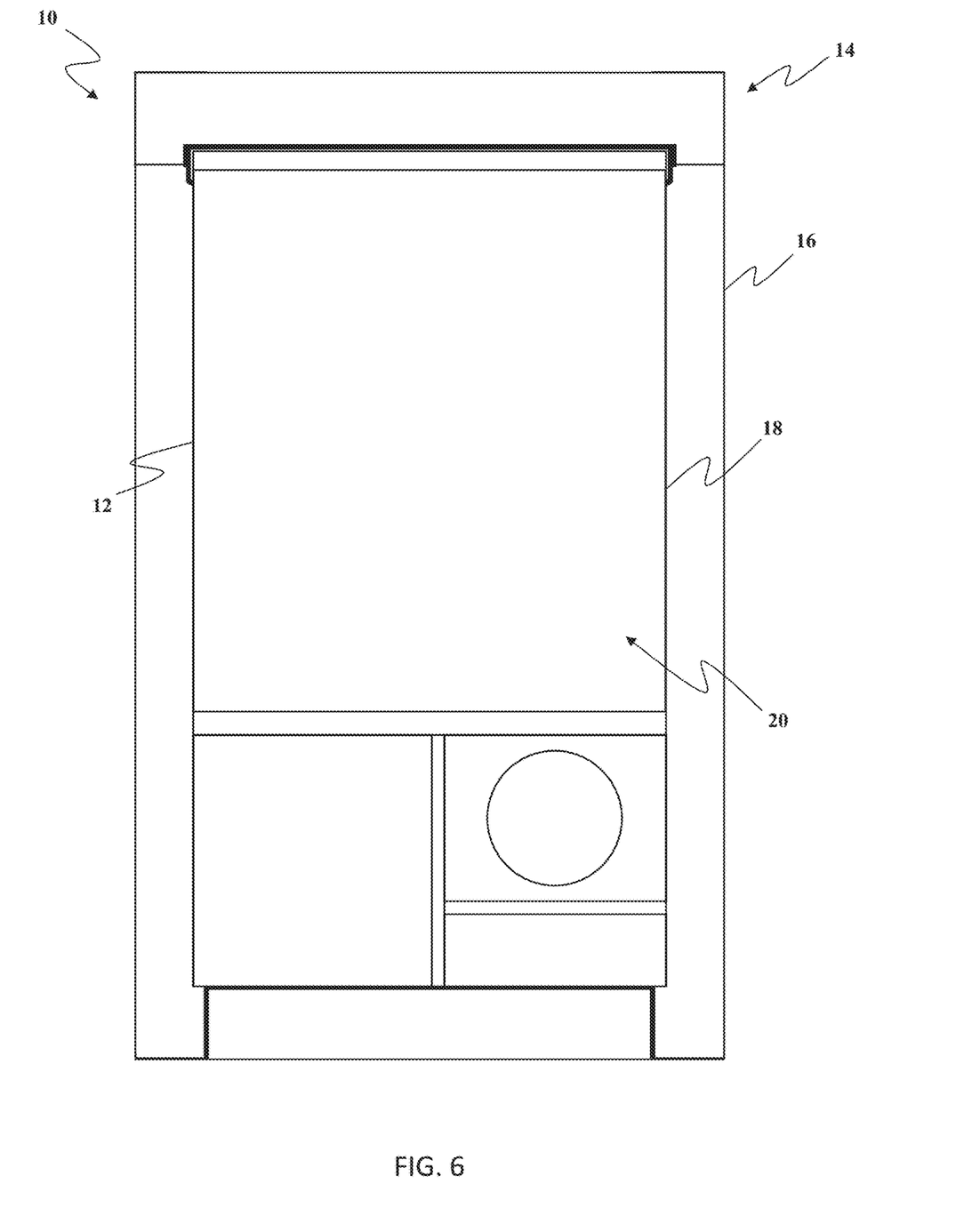
FIG. 6 is a schematic view of the flashing system shown in FIG. 2 mounted to the electrical service panel shown in FIG. 1.

FIG. 1 illustrates an exemplary prior art residential electrical junction box 10 that is standard in the industry. This electrical service panel 12 is shown in a conventional mount configuration positioned on the exterior side of a wall, coupled to standard two-by-four wood studs extending upwardly from a base frame member positioned on a concrete foundation. However, use on conventional metal studs is expressly contemplated herein.

Referring to FIGS. 2-10, in the illustrated embodiment, the flashing system 10 includes a flashing assembly 14 that is coupled to the electrical service panel 12 and extends about a perimeter of the electrical service panel 12. The flashing assembly 14 includes a support base 16 and a flanged connection assembly 18 that extends outwardly from the support base 16. The flanged connection assembly 18 defines an opening 20 extending through the flashing assembly 14 that is sized and shaped to receive the electrical service panel 12 therethrough. The flanged connection assembly 18 includes an inner surface that is coupled to an outer surface of the electrical service panel 12 for supporting the flashing assembly 14 from the electrical service panel 12. In some embodiments, the flashing system 10 may include an adhesive material that is positioned between the inner surface of the flanged connection assembly 18 and the outer surface of the electrical service panel 12 to facilitate coupling the flashing assembly 14 to the electrical service panel 12. For example, in some embodiments, the adhesive material may include double-sided adhesive tape and/or any suitable adhesive material for use in coupling the flashing assembly 14 to the electrical service panel 12. In other embodiments, the flanged connection assembly 18 may be sized and shaped to contact the outer surface of the electrical service panel 12 to facilitate coupling the flashing assembly 14 to the electrical service panel 12 via a friction fit.

In the illustrated embodiment, the support base 16 includes a substantially planar outer surface that extends about a perimeter of the flanged connection assembly 18 to form a substantially rectangular cross-sectional shape. The flanged connection assembly 18 includes a plurality of sidewalls 22 that extend obliquely from an outer surface of the support base 16. In some embodiments, the plurality of sidewalls 22 are orientated substantially perpendicular from the outer surface of the support base 16 (e.g. at a 90° angle from the support base). The plurality of sidewalls 22 include a top endwall 24, a bottom endwall 26, and a pair of sidewalls 28, 30 that extend from the top endwall 24 towards the bottom endwall 26. The top endwall 24 is spaced a distance from the bottom endwall 26 along a first axis 32 (e.g. a vertical axis) and the pair of sidewalls 28, 30 are spaced a distance apart along a second axis 34 (e.g. a horizontal axis). The top endwall 24 and the bottom endwall 26 are orientated substantially parallel and each having a width defined along the second axis 34. The top endwall 24 includes a first width 38 defined between the pair of sidewalls 28, 30 and the bottom endwall 26 includes a second width 40 defined between the pair of sidewalls 28, 30. The sidewalls 28, 30 each include opposing flared sections 36 defined along an upper portion of the flanged connection assembly 18 such that the first width 38 of the top endwall 24 is longer than the second width 40 of the bottom endwall 26.

In some embodiments, the flashing system 10 includes a plurality of flashing members 42 that form the flashing assembly 14. Each flashing member 42 includes a support member 44 that forms a portion of the support base 16 and a connection flange member 46 that forms a portion of the flanged connection assembly 18. In some embodiments, the flashing system 10 may include an upper flashing member 48 positioned adjacent to a top portion of the electrical service panel 12, a bottom flashing member 50 positioned adjacent to a bottom portion of the electrical service panel 12, and a pair of side flashing members 52, 54 that are positioned adjacent to opposing side portions of the electrical service panel 12. During assembly, each side flashing members 52, 54 overlaps a portion of the bottom flashing member 50 and the upper flashing member 48 overlaps a portion of each of the side flashing members 52, 54.

Figure 7:
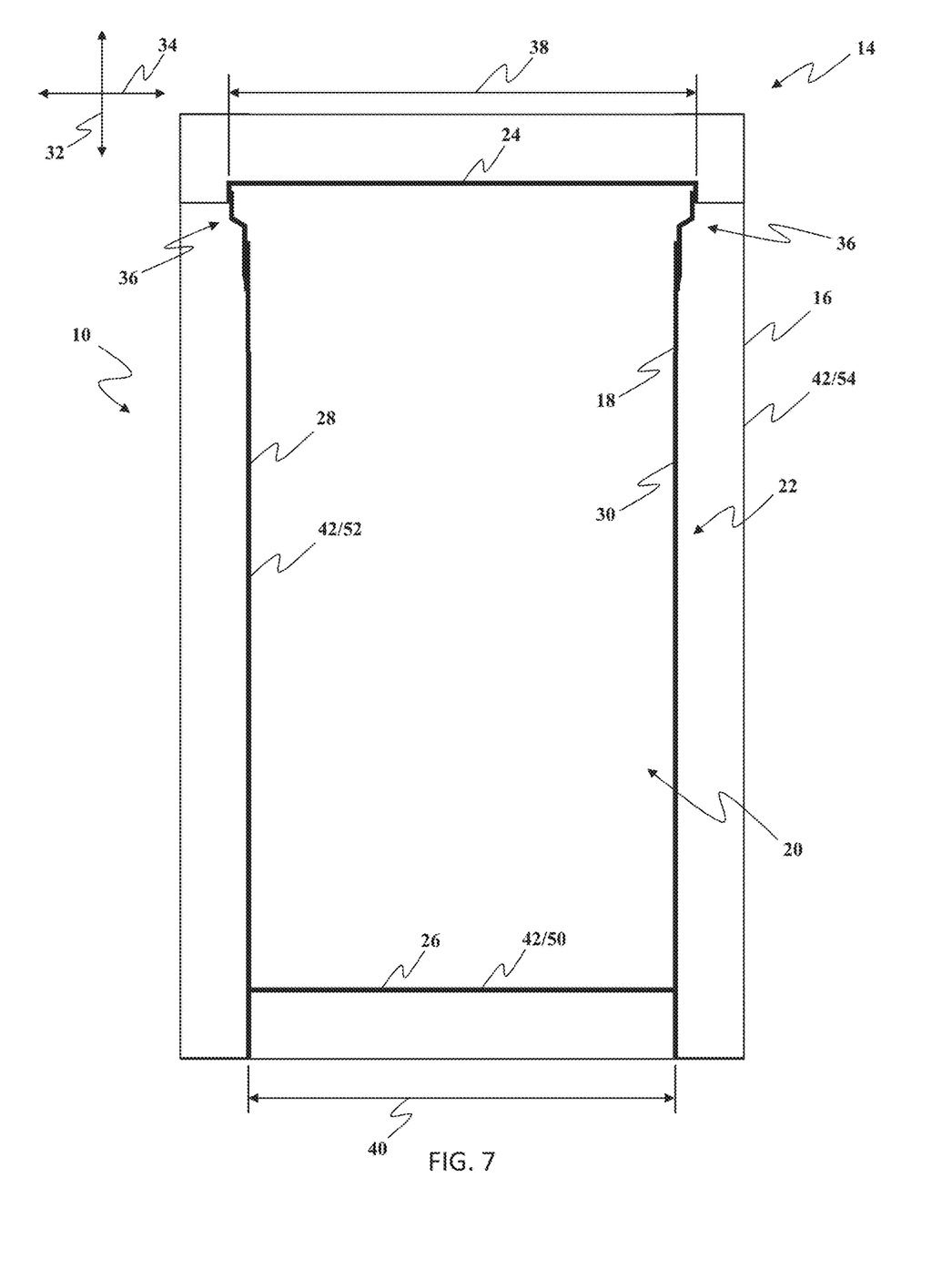
FIG. 7 is a schematic view of the flashing system shown in FIG. 6.
Figure 8:
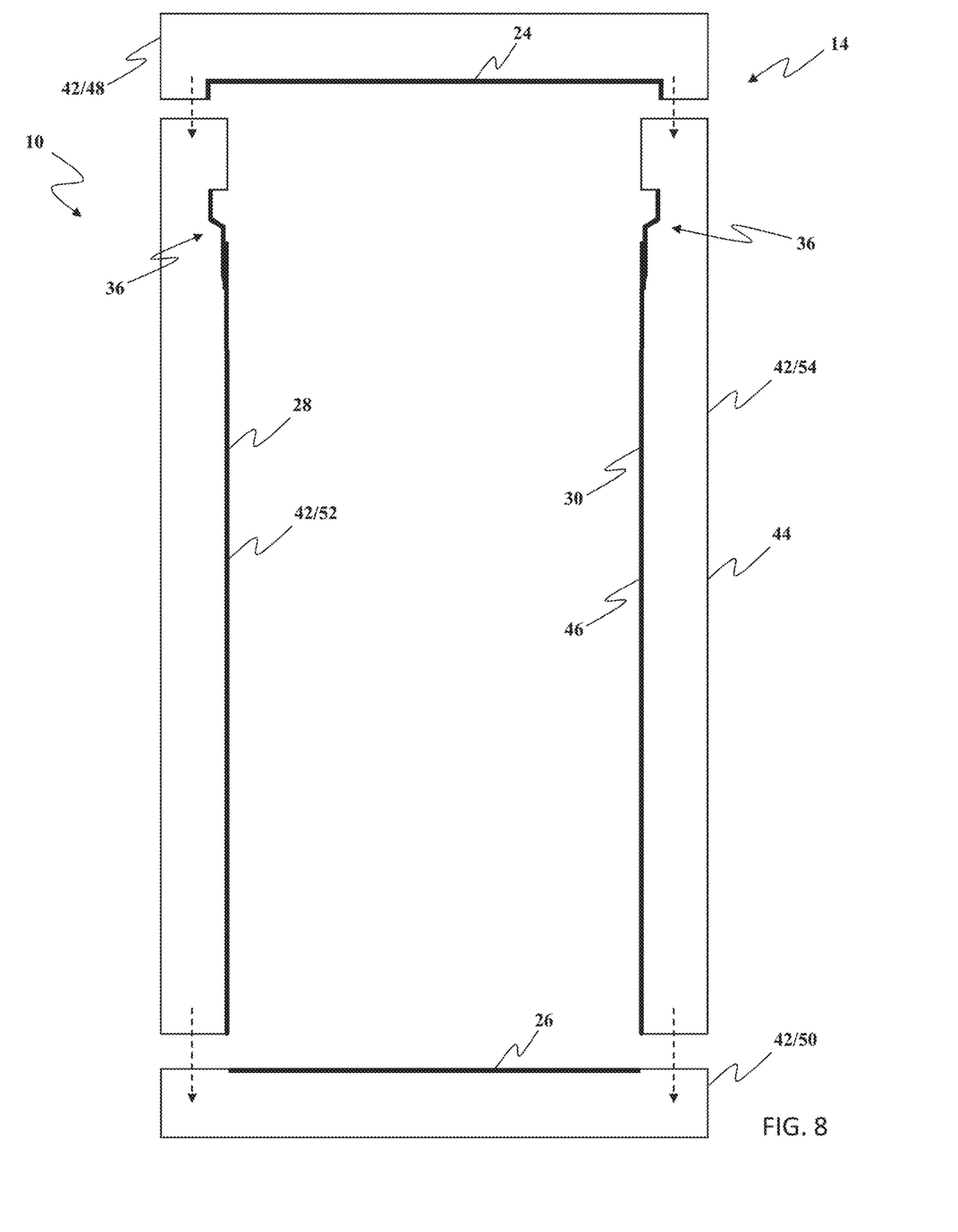
FIG. 8 is an exploded view of the flashing system shown in FIG. 7.
Figure 9:
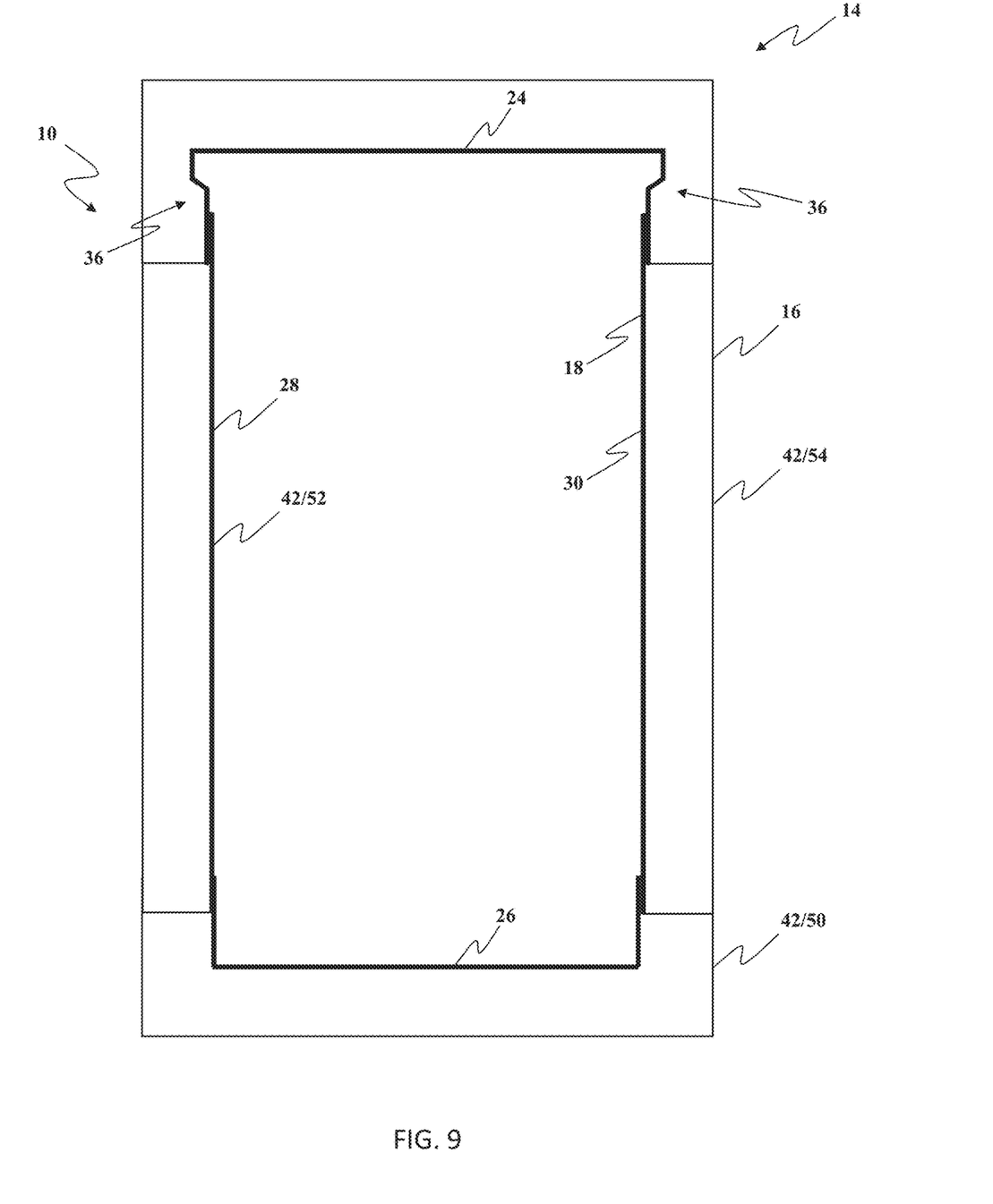
FIG. 9 is a schematic view of the flashing system, according to another embodiment of the present invention.
Figure 10:
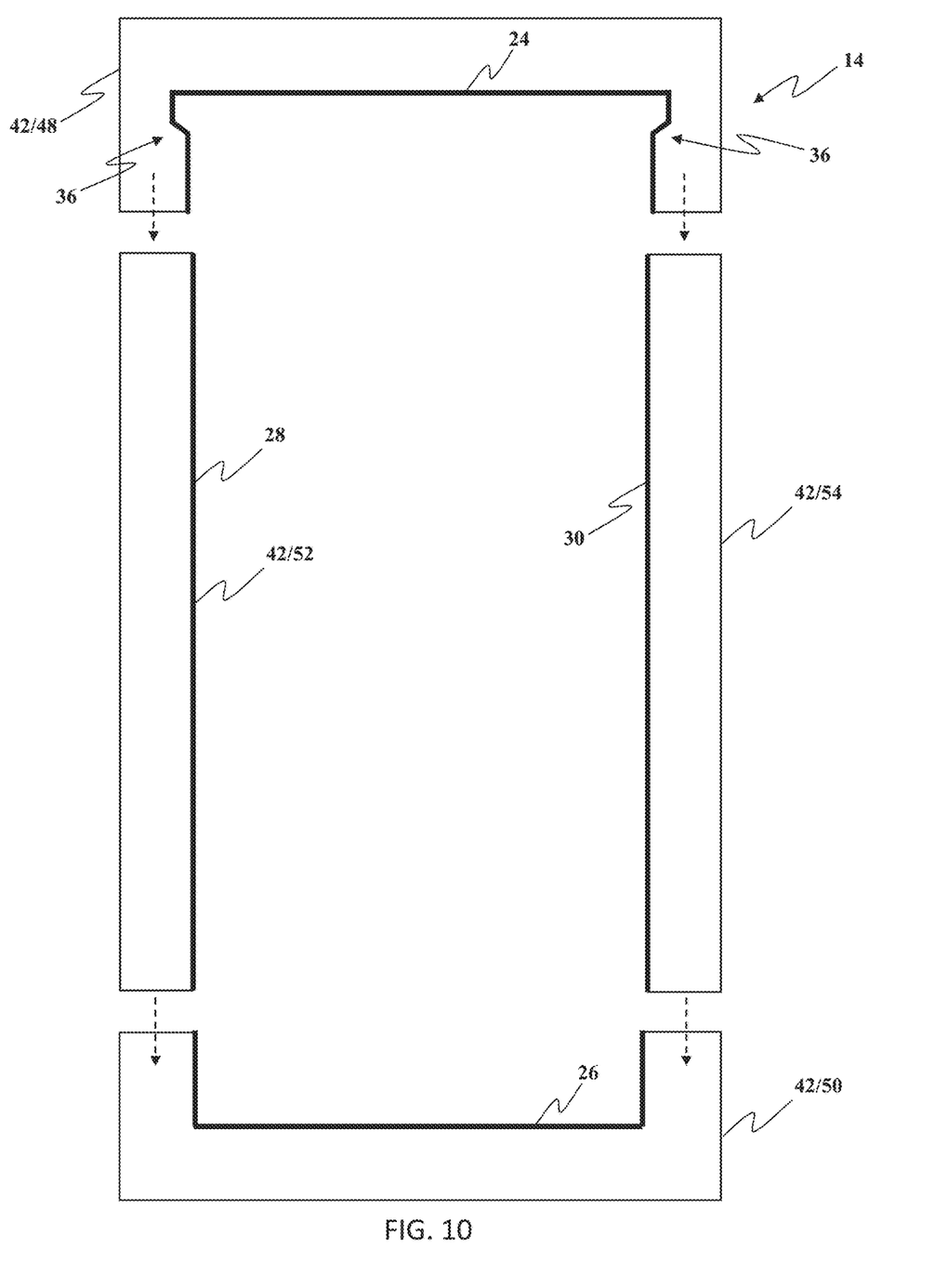
FIG. 10 is an exploded view of the flashing system shown in FIG. 9.

As shown in FIGS. 7-8, in some embodiments, each of the side flashing members 52, 54 includes an opposing flared section 36. The upper flashing member 48 is also positioned such that opposing end portions of the connection flange member 46 of the upper flashing member 48 overlaps a portion of the connection flange member 46 of each of the side flashing members 52, 54 (shown in FIGS. 3-7). In other embodiments, as shown in FIGS. 9-10, connection flange member 46 of the upper flashing member 48 may include the opposing flared sections 36.

Figure 11:
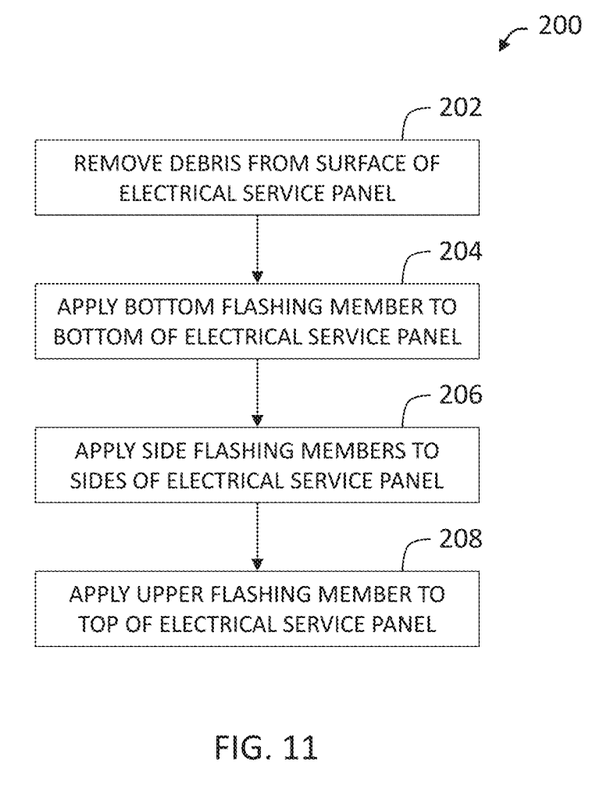
FIG. 11 is a flow charts illustrating a method of assembling the flashing system.

FIG. 11 is a flow chart of a method 200 of installing the flashing system 10 onto the electrical service panel 12. Each method step, or portions of the method steps, may be performed independently of, or in combination with, other method steps.

In method step 202, an installer removing construction dust from an outer surface of the electrical service panel prior to coupling the plurality of flashing members 42 to the electrical service panel 12. For example, the installer may remove any construction dust, debris, or foreign materials from the outer surface of the electrical service panel using an alcohol wipe, cloth, or similar cleaning wipe, applied to the exterior surfaces of the electrical service panel.

In method step 204, the installer couples the bottom flashing member 50 to a bottom portion of the electrical service panel 12 using an adhesive material such that the connection flange member 46 of each of the bottom flashing member 50 adheres to the outer surface of the electrical service panel 12.

In method step 206, the installer then couples each pair of side flashing members 52, 54 to the opposing sides of the electrical service panel 12 such that the pair of side flashing members 52, 54 overlap portions of the bottom flashing member 50. The installer uses adhesive material applied to the connection flange members 46 of side flashing member 52, 54 to adhere the side flashing members 52, 54 to the outer surface of the electrical service panel 12.

In method step 208, the installer then couples the upper flashing member 48 to a top portion of the electrical service panel 12 such that the upper flashing member 48 overlaps portions of each side flashing member 52, 54. The installer also uses adhesive material applied to the connection flange member 46 of upper flashing member 48 to adhere the upper flashing member 48 to the outer surface of the electrical service panel 12. The opposing end portions of the connection flange member 46 of the upper flashing member 48 overlaps portions of the corresponding connection flange members 46 of each side flashing member 52, 54.

Obviously, many modifications and variations of the present invention are possible in light of the above teachings. The invention may be practiced otherwise than as specifically described within the scope of the appended claims.

Although specific features of various embodiments of the disclosure may be shown in some drawings and not in others, this is for convenience only. In accordance with the principles of the disclosure, any feature of a drawing or other embodiment may be referenced and/or claimed in combination with any feature of any other drawing or embodiment.

This written description uses examples to describe embodiments of the disclosure and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A flashing system for use with an electrical service panel, comprising:

a flashing assembly extending about a perimeter of the electrical service panel, the flashing assembly comprising:

a support base including a planar outer surface;

a flanged connection assembly including a plurality of sidewalls extending obliquely from the planar outer surface of the support base and defining an opening configured to receive the electrical service panel therethrough, the flanged connection assembly includes an inner surface that is coupled to an outer surface of the electrical service panel for supporting the flashing assembly from the electrical service panel; and a plurality of flashing members, each flashing member including a support member forming a portion of the support base and a connection flange member forming a portion of the flanged connection assembly;

wherein the plurality of flashing members includes an upper flashing member positioned adjacent to a top portion of the electrical service panel, and a pair of side flashing members positioned adjacent to opposing side portions of the electrical service panel;

wherein the upper flashing member is positioned such that opposing end portions of the connection flange member of the upper flashing member overlaps a top portion of corresponding connection flange members of each of the side flashing members; and wherein the connection flange member of each side flashing member includes a flared section adjacent the upper flashing member such that the flanged connection assembly includes a top width defined adjacent the top portion the electrical service panel and bottom width defined adjacent a bottom portion of the electrical service panel that is less than the top width.

2. The flashing system of claim 1, wherein the plurality of flashing members are formed from a thermoplastic elastomer material.

3. The flashing system of claim 1, wherein the substantially planar outer surface of the support base extends about a perimeter of the flanged connection assembly to form a substantially rectangular cross-sectional shape.

4. The flashing system of claim 1, further comprising an adhesive material positioned between the inner surface of the flanged connection assembly and the outer surface of the electrical service panel to facilitate coupling the flashing assembly to the electrical service panel.

5. The flashing system of claim 4, wherein the adhesive material includes a double-sided adhesive tape.

6. The flashing system of claim 1, wherein the plurality of flashing members includes a bottom flashing member positioned adjacent to the bottom portion of the electrical service panel.

7. The flashing system of claim 6, wherein the upper flashing member overlaps a portion of each of the side flashing members.

8. The flashing system of claim 7, wherein each side flashing member overlaps a portion of the bottom flashing member.

9. A method of installing a flashing assembly onto an electrical service panel, the flashing assembly including a plurality of flashing members including an upper flashing member, and a pair of side flashing members, each flashing member including a support member having a planar outer surface and a connection flange member extending obliquely from the planar outer surface, each support member forming a support base extending about a perimeter of the electrical service panel and each connection flange member forming a flanged connection assembly coupled to an outer surface of the electrical service panel, the method comprising:

coupling the pair of side flashing members to opposing sides of the electrical service panel; and     coupling the upper flashing member to a top portion of the electrical service panel such that the upper flashing member overlaps portions of each side flashing member     wherein the upper flashing member is positioned such that opposing end portions of the connection flange member of the upper flashing member overlap a top portion of corresponding connection flange members of each of the side flashing members; and     wherein the connection flange member of each side flashing member includes a flared section adjacent the upper flashing member such that the flanged connection assembly includes a top width defined adjacent the top portion the electrical service panel and bottom width defined adjacent a bottom portion of the electrical service panel that is less than the top width.

10. The method of claim 9, further comprising coupling the plurality of flashing members to the electrical services panel using construction adhesive.

11. The method of claim 9, further comprising removing construction dust from an outer surface of the electrical service panel prior to coupling the plurality of flashing members to the electrical service panel.

12. The method of claim 9, further comprising coupling a bottom flashing member to the bottom portion of the electrical service panel.

13. The method of claim 9, wherein the support member of each of the plurality of flashing members form the support base having a substantially rectangular cross-sectional shape.

14. The method of claim 9, wherein the plurality of flashing members are formed from a thermoplastic elastomer material.

* * * * *